(12) United States Patent
Freeman et al.

(10) Patent No.: US 11,220,925 B2
(45) Date of Patent: Jan. 11, 2022

(54) TURBINE SHROUD WITH FRICTION MOUNTED CERAMIC MATRIX COMPOSITE BLADE TRACK

(71) Applicants: Rolls-Royce North American Technologies Inc., Indianapolis, IN (US); Rolls-Royce Corporation, Indianapolis, IN (US); Rolls-Royce plc, London (GB)

(72) Inventors: Ted J. Freeman, Danville, IN (US); Aaron D. Sippel, Zionsville, IN (US); Shaling Starr, Fishers, IN (US); Paulo Bazan, Coconut Creek, FL (US); Adrian Harding, London (GB); Jeffrey A. Walston, Indianapolis, IN (US)

(73) Assignees: Rolls-Royce North American Technologies Inc., Indianapolis, IN (US); Rolls-Royce Corporation, Indianapolis, IN (US); Rolls-Royce plc

( * ) Notice: Subject to any disclaimer, the term of this patent is extended or adjusted under 35 U.S.C. 154(b) by 0 days.

(21) Appl. No.: 17/068,268

(22) Filed: Oct. 12, 2020

(65) Prior Publication Data
US 2021/0108532 A1    Apr. 15, 2021

Related U.S. Application Data

(60) Provisional application No. 62/913,477, filed on Oct. 10, 2019.

(51) Int. Cl.
*F01D 11/08*    (2006.01)

(52) U.S. Cl.
CPC .......... *F01D 11/08* (2013.01); *F05D 2220/32* (2013.01); *F05D 2240/55* (2013.01); *F05D 2260/31* (2013.01); *F05D 2300/6033* (2013.01)

(58) Field of Classification Search
CPC .... F01D 11/08; F01D 25/246; F05D 2220/32; F05D 2240/11; F05D 2240/55; F05D 2260/31; F05D 2300/6033
See application file for complete search history.

(56) References Cited

U.S. PATENT DOCUMENTS

| 5,080,557 A | 1/1992 | Berger |
| 6,884,026 B2 | 4/2005 | Glynn et al. |
| 7,416,362 B2 | 8/2008 | North |
| 2006/0292001 A1 | 12/2006 | Keller et al. |
| 2009/0208284 A1 | 8/2009 | Funnell |
| 2015/0044049 A1* | 2/2015 | Lamusga ................ F01D 11/08 416/182 |
| 2016/0186999 A1 | 6/2016 | Freeman et al. |
| 2016/0319688 A1 | 11/2016 | Vetters et al. |
| 2016/0376901 A1* | 12/2016 | O'Leary ................... F01D 9/02 415/116 |

(Continued)

*Primary Examiner* — Igor Kershteyn
(74) *Attorney, Agent, or Firm* — Barnes & Thornburg LLP

(57) ABSTRACT

A turbine shroud adapted for use in a gas turbine engine includes a seal segment and an attachment unit. The seal segment includes an arcuate shroud wall that extends circumferentially partway around an axis and a mount post that extends radially outward away from the shroud wall. The attachment unit includes a first carrier and a second carrier that cooperate to define a channel that receives at least a portion of the mount post.

20 Claims, 9 Drawing Sheets

(56) References Cited

U.S. PATENT DOCUMENTS

| | | | |
|---|---|---|---|
| 2016/0376906 A1* | 12/2016 | O'Leary | F01D 9/04 |
| | | | 415/173.1 |
| 2016/0376907 A1* | 12/2016 | O'Leary | F01D 11/001 |
| | | | 415/173.3 |
| 2016/0376921 A1* | 12/2016 | O'Leary | F01D 25/12 |
| | | | 415/116 |
| 2018/0051581 A1 | 2/2018 | Quennehen et al. | |
| 2018/0291769 A1 | 10/2018 | Vetters et al. | |
| 2018/0340440 A1 | 11/2018 | Freeman et al. | |
| 2021/0108532 A1* | 4/2021 | Freeman | F01D 25/246 |
| 2021/0148250 A1* | 5/2021 | Sippel | F01D 11/08 |

\* cited by examiner

TURBINE SHROUD WITH FRICTION MOUNTED CERAMIC MATRIX COMPOSITE BLADE TRACK

CROSS REFERENCE TO RELATED APPLICATIONS

This application claims priority to and the benefit of U.S. Provisional Patent Application No. 62/913,477, filed 10 Oct. 2019, the disclosure of which is now expressly incorporated herein by reference.

FIELD OF THE DISCLOSURE

The present disclosure relates generally to gas turbine engines, and more specifically to turbine shroud assemblies for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional fasteners such as rivets or bolts may not allow for the differing levels of expansion and contraction during operation of the gas turbine engine.

SUMMARY

The present disclosure may comprise one or more of the following features and combinations thereof.

A turbine shroud adapted for use in a gas turbine engine may include a seal segment, an attachment unit, and a pin. The seal segment may comprise ceramic matrix composite materials. The seal segment may include an arcuate shroud wall that extends circumferentially partway around an axis to define a gas path boundary of the turbine shroud and a mount post that extends radially outward away from the shroud wall. The attachment unit may comprise metallic materials. The attachment unit may be configured to support the seal segment in position radially relative to the axis. The attachment unit may include a fore carrier that extends at least partway about the axis and an aft carrier that extends at least partway about the axis and cooperates with the fore carrier to define a channel that opens radially inwardly and receives a portion of the mount post of the seal segment to locate the mount post of the seal segment axially between the fore carrier and the aft carrier.

The pin may extend axially into the fore carrier, the mount post, and the aft carrier to interlock the seal segment with the attachment unit and limit circumferential movement of the seal segment relative to the attachment unit about the axis. Whereby radial force loads from gases may be applied to inner and outer radial sides of the shroud wall during use of the turbine shroud which may urge the seal segment to move radially relative to the attachment unit. The seal segment may be clamped between the fore carrier and the aft carrier so that frictional forces acting on the mount post counteract at least a portion of the radial force loads to resist radial movement of the mount post relative to the attachment unit.

In some embodiments, the fore carrier may be formed to include an axially extending first blind hole. The mount post may be formed to include an axially extending through hole. The aft carrier may be formed to include an axially extending second blind hole. The pin may extend into the first blind hole, through the through hole, and into the second blind hole.

In some embodiments, the attachment unit may include a key. The key may extend radially into the fore carrier and the aft carrier to couple the fore carrier with the aft carrier and maintain the compressive clamp force applied to the mount post.

In some embodiments, the fore carrier may be formed to include a first through hole. The aft carrier may be formed to define a second through hole. The attachment unit may include a fastener that extend through the first through hole and the second through hole to couple the first carrier with the second carrier.

In some embodiments, the mount post may be formed to define a cutout. The cutout may extend radially inward partway into the mount post and axially through the mount post so that the mount post is U-shaped when viewed axially relative to the axis and the fastener extends through the cutout without contacting the mount post.

In some embodiments, the seal segment may be clamped between the fore carrier and the aft carrier. As a result, the frictional forces acting on the mount post may counteract all of the radial force loads to resist radial movement of the mount post relative to the attachment unit such that no radial force loads are counteracted by the pin.

In some embodiments, the fore carrier may include a fore support body and a fore plate having a fore facing surface and an aft facing surface. The second carrier may include an aft support body and an aft plate having a fore facing surface and an aft facing surface. The fore plate and the aft plate may be clamped between the fore support body and the aft support body. The mount post may be clamped between the fore plate and the aft plate. At least one of the aft facing surface of the fore plate and the fore facing surface of the aft plate may be angled relative to a plane that extends perpendicular to the axis.

According to another aspect of the present disclosure, a turbine shroud may include a seal segment and an attachment unit. The seal segment may include an arcuate shroud wall that extends circumferentially partway around an axis and a mount post that extends radially outward away from the shroud wall. The attachment unit may extend at least partway about the axis. The attachment unit may include a first carrier and a second carrier that cooperate to define a channel that opens radially inwardly and receives at least a portion of the mount post. The first carrier may be coupled with the second carrier such that the first carrier and the second carrier apply a compressive clamp force to the mount post of the seal segment.

In some embodiments, the turbine shroud may include a pin that extends axially into the first carrier, the mount post, and the second carrier to interlock the seal segment with the attachment unit. In some embodiments, the first carrier may be formed to include an axially extending first blind hole. The mount post may be formed to include an axially extending through hole. The second carrier may be formed to include an axially extending second blind hole. The pin may extend into the first blind hole, through the through hole, and into the second blind hole.

In some embodiments, the first blind hole and the second blind hole may be circumferentially extending slots. In some embodiments, the turbine shroud may include a bias member arranged around the pin and located between the mount post and one of the first carrier and the second carrier.

In some embodiments, the first carrier may be formed to include a first through hole. The second carrier may be formed to define a second through hole. The attachment unit may include a fastener that extends through the first through hole and the second through hole to couple the first carrier with the second carrier.

In some embodiments, the mount post may be formed to define a cutout that extends radially inward partway into the mount post and axially through the mount post. The fastener may extend through the cutout without contacting the mount post.

In some embodiments, the mount post may be formed to define a third through hole. The fastener may extend through the third through hole.

In some embodiments, the turbine shroud may further comprise a first pin and a second pin. The second pin may be spaced apart circumferentially from the first pin. Each of the first pin and the second pin may extend axially into the first carrier, the mount post, and the second carrier to interlock the seal segment with the attachment unit.

In some embodiments, the first carrier may have a first engagement surface. The mount post may have a first face engaged with the first engagement surface. The first engagement surface may be angled relative to first face to define an angle therebetween and the angle may be less than 90 degrees.

In some embodiments, the shroud segment may include a shim. The shim may be located between the mount post and the first carrier and directly engaged with the mount post and the first carrier.

In some embodiments, the first carrier and the second carrier may be integrally formed as a one-piece component. The seal segment may be coupled with the attachment unit for movement with the attachment unit only by frictional forces between the seal segment, the first carrier, and the second carrier.

According to another aspect of the present disclosure, a method may include a number of steps. The method may include providing a seal segment, an attachment unit, and a pin, the seal segment includes an arcuate shroud wall and a mount post that extends outward away from the shroud wall, and the attachment unit including a first carrier and a second carrier that cooperate to define a channel between the first carrier and the second carrier, locating the mount post in the channel, inserting the pin through the mount post and at least partway into the first carrier and the second carrier, and applying a clamp force to the mount post with the first carrier and the second carrier.

In some embodiments, the method may include inserting a key or fastener into the first carrier and the second carrier to couple the first carrier with the second carrier and maintain the clamp force on the mount post.

These and other features of the present disclosure will become more apparent from the following description of the illustrative embodiments.

DETAILED DESCRIPTION OF THE DRAWINGS

Figure 1:
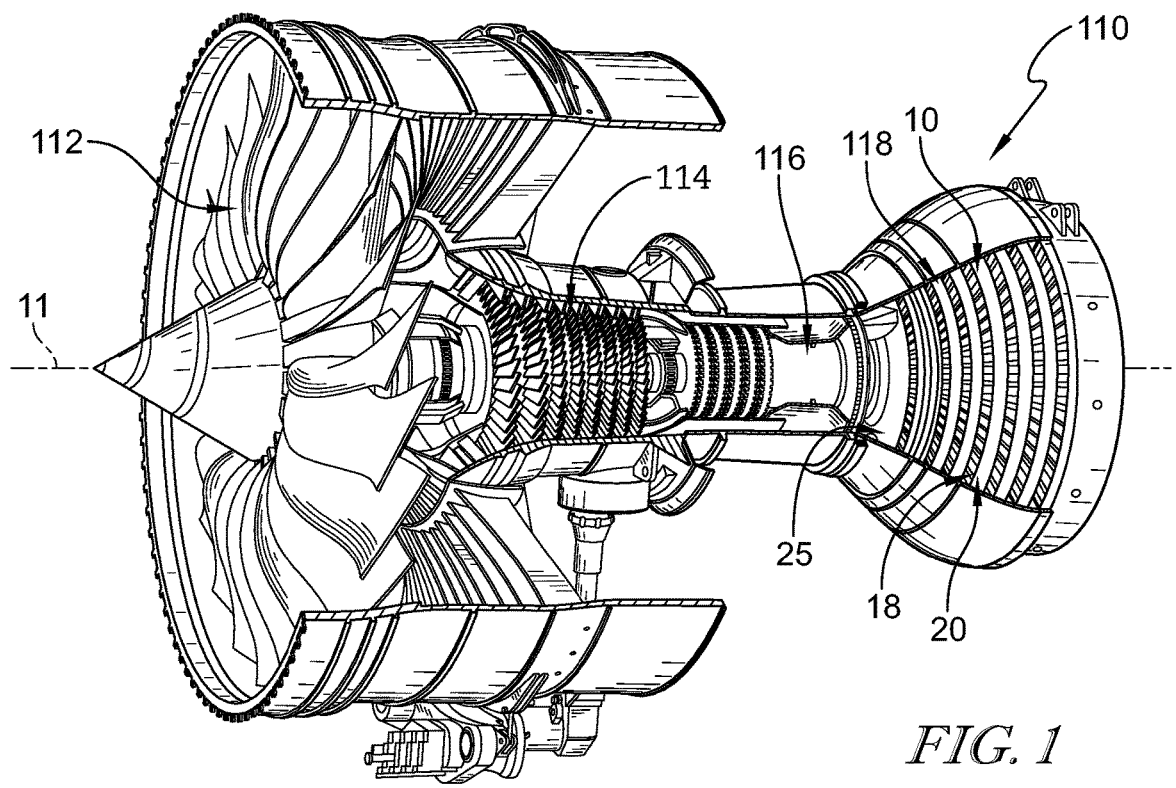
FIG. 1 is a cutaway view of a gas turbine engine that includes a fan, a compressor, a combustor, and a turbine, the turbine includes turbine wheels that are driven to rotate about an axis of the engine to generate power.

For the purposes of promoting an understanding of the principles of the disclosure, reference will now be made to a number of illustrative embodiments illustrated in the drawings and specific language will be used to describe the same.

Figure 2:
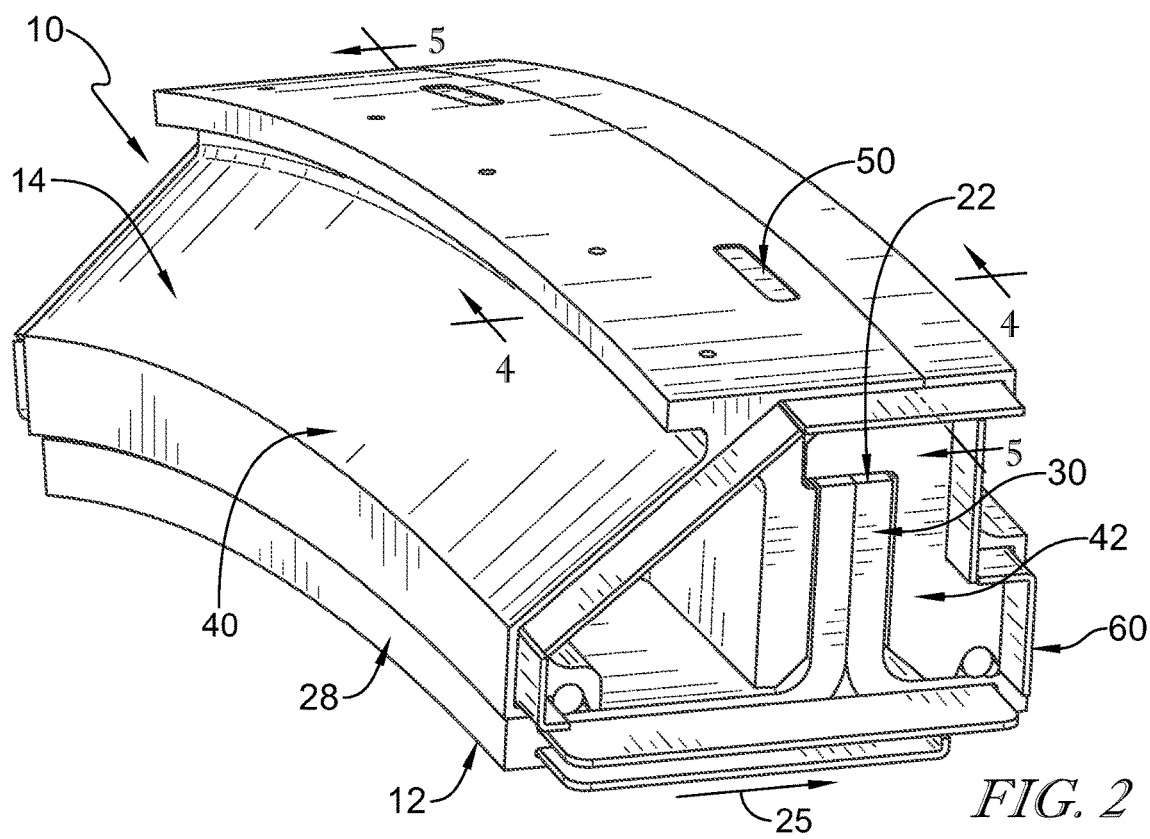
FIG. 2 is a perspective view of a turbine shroud included in the engine and adapted to be arranged around one of the turbine wheels, the turbine shroud including a fore carrier, an aft carrier, and a seal segment clamped between the fore and aft carriers to block the seal segment from moving radially during use of the gas turbine engine.
Figure 3:
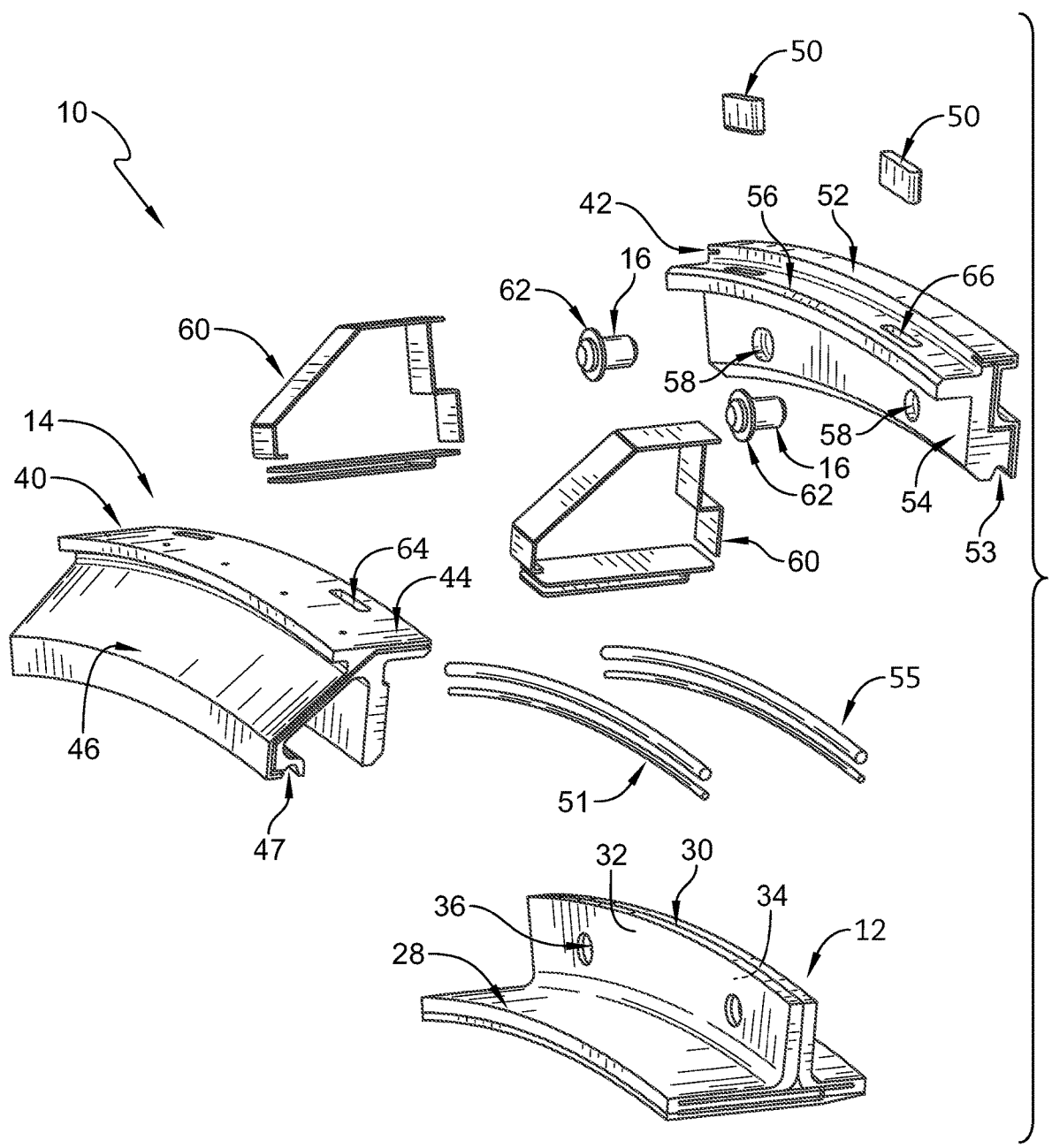
FIG. 3 is an exploded view of the turbine shroud of FIG. 2 showing the turbine shroud comprises an attachment unit including the fore and aft carriers, the seal segment, a plurality of pins adapted to extend into the fore carrier, the aft carrier, and the seal segment, and keys adapted to couple the carriers together and maintain the clamping force on the seal segment.
Figure 4:
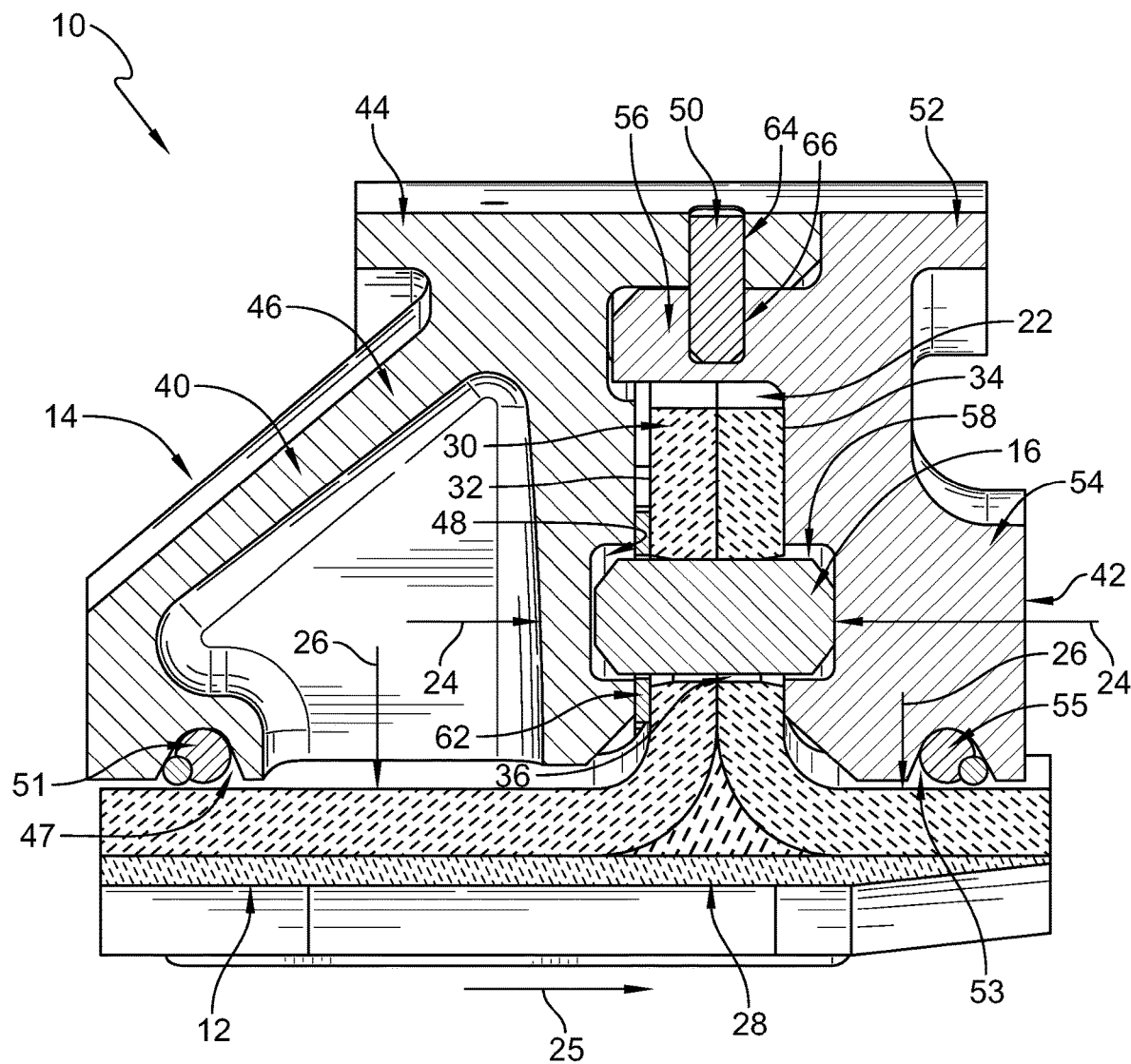
FIG. 4 is a section view of the turbine shroud taken along line 4-4 of FIG. 2 showing the seal segment clamped in a channel defined by the fore and aft carriers with a pin extending through the seal segment and trapped between the carriers to resist some or all of the radial forces acting on the seal segment, and a key extending radially into the fore and aft carriers to couple them together.

A turbine shroud 10 adapted for use with a gas turbine engine 110 is shown in FIGS. 1-5. The turbine shroud 10 includes a seal segment 12, an attachment unit 14, and pins 16 as shown in FIGS. 3 and 4. The present disclosure provides methods and apparatuses for supporting the seal segment 12 with the attachment unit 14 using friction clamping. The pins 16 and/or other fasteners may be used in conjunction with the friction clamping to support the seal segment 12. In other embodiments, the pins 16 are omitted and the attachment unit 14 supports the seal segment 12 only with friction clamping as suggested in FIG. 15.

The seal segment 12 extends partway circumferentially about an axis 11 and defines a gas path 25 boundary of the turbine shroud 10 as suggested in FIG. 4. The attachment unit 14 supports the seal segment 12 in position radially relative to the axis 11 and defines a channel 22 that receives a portion of the seal segment 12 therein. The pins 16 extend into the seal segment 12 and the attachment unit 14 to mechanically interlock the seal segment 12 with the attachment unit 14. The seal segment 12 is clamped by the attachment unit 14 so that frictional forces 24 acting on the seal segment 12 counteract at least a portion of radial force loads 26 applied to the seal segment 12 during use of the turbine shroud to resist radial movement of the seal segment 12 relative to the attachment unit 14.

The frictional forces 24 may be sufficient to hold the seal segment 12 in place relative to the axis 11 at all operating points of the gas turbine engine 110 throughout the operating envelope without the assistance of the pins 16 or other fasteners or interlocking mechanisms like bolts, keys, hooks, etc. as suggested in FIG. 4. In illustrative embodiments, the pins 16 and the frictional clamping forces 24 share the radial force loads 26 acting on the seal segment 12. This configuration may reduce the peak mechanical stresses applied to the pins 16 and pin interfaces of the seal segment 12. Even still, the pins 16 and clamping frictional forces 24 may each be configured to carry one hundred percent (100%) of the radial force loads 26 acting on the seal segment 12 during use of the turbine shroud 10 without failing so that the turbine shroud 10 has redundant support features for the seal segment 12.

The turbine shroud 10 is adapted for use in the gas turbine engine 110 which includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112. In other embodiments, the fan 112 may be omitted and the turbine 118 drives a propeller, drive shaft, or other suitable alternative.

The turbine 118 includes a plurality of the static turbine vane rings 18 that are fixed relative to the axis 11 and a plurality of the bladed wheel assemblies 20 as suggested in FIG. 1. Each turbine vane ring 18 includes a plurality of airfoils. The hot gases are conducted through the gas path 25 and interact with the bladed wheel assemblies 20 to cause the bladed wheel assemblies 20 to rotate about the axis 11. The turbine vane rings 18 are positioned to direct the gases toward the bladed wheel assemblies 20 with a desired orientation. The turbine shroud 10 is arranged circumferentially around one of the bladed wheel assemblies 20 to block the gases from passing around outer tips of blades included in the bladed wheel assembly 20. Gases that pass around the outer tips may not rotate the bladed wheel assembly 20 and the energy of the gases may be lost to heat waste.

The seal segment 12 of the illustrative turbine shroud 10 is made entirely of ceramic matrix composite materials and the attachment unit 14 is made of metallic materials in the illustrative embodiments. The ceramic matrix composite seal segment 12 is adapted to withstand high temperatures, but may have relatively low strength compared to the metallic attachment unit 14. The attachment unit 14 provides structural strength to the turbine shroud 10 by receiving the force loads applied to the seal segment 12 and transferring them to a casing that surrounds the turbine shroud 10. The attachment unit 14 may not be capable of withstanding directly the high temperatures experienced by the seal segment 12.

In illustrative embodiments, the seal segment 12 comprises ceramic materials while the attachment unit 14 comprises metallic materials. Illustratively, the seal segment 12 comprises ceramic matrix composite materials. In other embodiments, the seal segment 12, the attachment unit 14, and the pins 16 may each comprise any suitable materials including ceramics, ceramic matrix composites, metals, alloys, super alloys, etc.

The seal segment 12 includes an arcuate shroud wall 28 and a mount post 30 as shown in FIGS. 3 and 4. The shroud wall 28 extends circumferentially partway about the axis 11 to define a portion of the gas path 25. The mount post 30 extends radially away from the shroud wall 28 and is configured to be engaged with the attachment unit 14 to couple the seal segment 12 with the attachment unit 14. The shroud wall 28 and the mount post 30 are integrally formed to provide a single, one-piece component.

The shroud wall 28 is located radially outward of one of the rotating wheel assemblies 20. During use of the turbine shroud 10, the hot gases in the gas path 25 apply a radial outward force to a radial inner surface of the shroud wall 28 which urge the seal segment 12 radially outward. Typically, cooling gas is applied to a radial outer surface of the shroud wall 28 to cool the seal segment 12 from the hot gases. The cooling gas urges the seal segment 12 radially inward relative to the axis 11.

The forces of cooling gas and the hot gases cooperate to provide the radial force loads 26 as suggested in FIG. 4. Illustratively, the force of the cooling gas is greater than the force of the hot gases such that the net radial force loads 26 acting on the seal segment 12 are radial inward and urge the seal segment 12 to move radially inward.

The mount post 30 extends substantially radially outward away from the shroud wall 28 as shown in FIGS. 3 and 4. The mount post 30 is received in the channel 22 and is clamped by the attachment unit 14. Illustratively, the seal segment 12 includes a single mount post 30. Such a design may allow for simple and low cost manufacturing of the seal segment 12. The mount post 30 is located axially offset of a midpoint of the shroud wall 28 in the aft direction. The mount post 30 includes a fore face 32 and an aft face 34 as shown in FIGS. 3 and 4. The mount post 30 is formed to include through holes 36 that extend axially through the mount post 30 and open into the fore face 32 and the aft face 34. The through holes 36 are illustratively circular when viewed along axis 11.

The attachment unit 14 supports the seal segment 12 in position radially relative to the axis 11 as suggested in FIG. 2. The attachment unit includes a fore carrier 40 that extends circumferentially at least partway about the axis 11 and an aft carrier 42 that extends circumferentially at least partway about the axis 11. The fore carrier 40 and the aft carrier 42 cooperate to define the channel 22 that opens radially inwardly and receives a portion of the mount post 30 of the seal segment 12 to locate the mount post 30 axially between the fore carrier 40 and the aft carrier 42.

The fore carrier 40 includes a fore hanger 44 and a fore body 46 as shown in FIGS. 3 and 4. The fore hanger 44 is configured to be supported on a case of the engine 110. The fore body 46 is coupled with the fore hanger 44 and extends radially inward from the fore hanger 44. The fore body 46 extends axially along the shroud wall 28 and radially along the mount post 30. The fore hanger 44 is formed to define slots 64 that extend radially through the fore hanger 44 to receive keys 50. The fore body 46 is spaced apart axially from the fore face 32 of the mount post 30 due to a bias member 62. In other embodiments, the fore body 46 directly engages the fore face 32.

Figure 5:
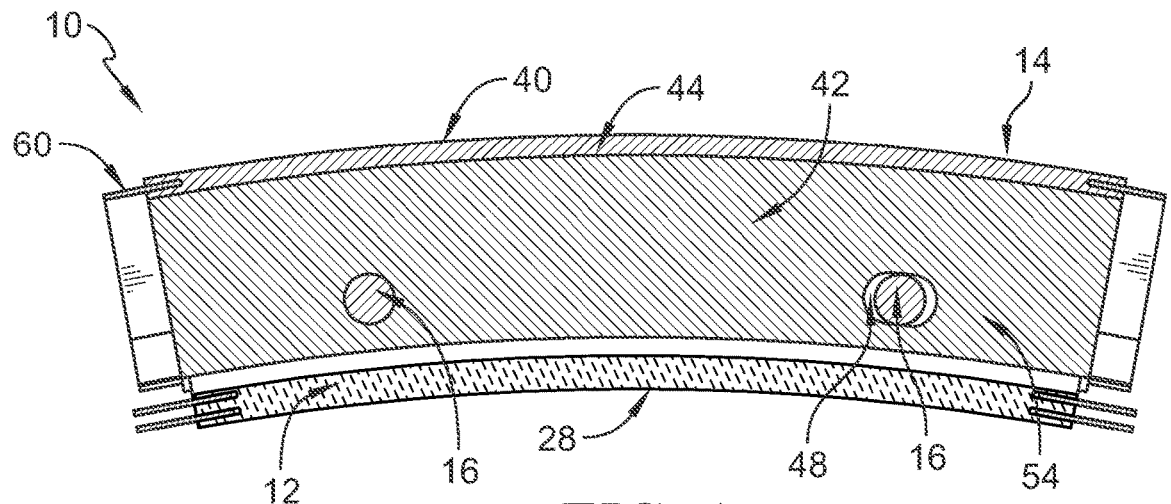
FIG. 5 is a front elevation view of the seal segment of FIG. 2 with some portions shown as being partially transparent to reveal the seal segment and pins located between the fore and aft carriers.

The fore body 46 is formed to define a plurality of blind holes 48 that extend axially partway into the fore body 46. The blind holes 48 are spaced apart from each other circumferentially. One blind hole 48 is circular in shape and one blind hole is a circumferentially extending slot 48 when viewed axially relative to the axis 11 as shown in FIG. 5. The slot allows for relative thermal growth between the fore carrier 40 and the seal segment 12.

The aft carrier 42 includes an aft hanger 52, an aft body 54, and a locator arm 56 as shown in FIGS. 3 and 4. The aft hanger 52 is configured to be supported on the case of the engine 110. The aft body 54 is coupled with the aft hanger 52 and extends radially inward from the aft hanger 52. The aft body 54 extends axially along the shroud wall 28 and radially along the mount post 30. The locator arm 56 extends axially away from the aft body 54 and is formed to define slots 66 that extend radially into the locator arm 56 to receive the keys 50. The fore body 46 and the aft body 54 cooperate to define the channel 22. The aft body 54 engages directly the aft face 34 of the mount post 30.

The aft body 54 is formed to define a plurality of blind holes 58 that extend axially partway into the aft body 54. The blind holes 58 are spaced apart from each other circumferentially. One blind hole 58 is circular in shape and one blind hole 58 is a circumferentially extending slot 58 when viewed axially relative to the axis 11 as shown in FIG. 5. The slot allows for relative thermal growth between the aft carrier 42 and the seal segment 12.

The fore body 46 is formed to define a circumferentially extending seal channel 47 configured to receive seals 51 therein. The seals 51 are engaged with the fore body 46 and a fore end of the shroud wall 28. In some embodiments, the seal channel 47 extends axially along circumferentially ends of the seal segment 12. The aft body 54 is formed to define a circumferentially extending seal channel 53 configured to receive seals 55 therein. The seals 55 engaged with the aft body 54 and an aft end of the shroud wall 28. In some embodiments, the seal channel 53 extends axially along circumferentially ends of the seal segment 12. The seal channels 47, 53 of the fore body 46 and the aft body 54 may be fluidly connected to form a single channel in some embodiments.

Each of the plurality of pins 16 extends axially into the fore carrier 40, the mount post 30, and the aft carrier 42 to mechanically interlock the seal segment 12 with the attachment unit 14 and limit circumferential movement of the seal segment 12 relative to the attachment unit 14. The pins 16 block circumferential movement of the seal segment 12 relative the attachment unit 14. The pins 16 may receive a portion of, all of, or none of the radial force loads 26 applied to the seal segment 12. Illustratively, each pin 16 comprises a relatively short dowel rod with tapered ends.

In one example, the pins 16 carry no radial loads during use of the turbine shroud 10 and provide a redundant coupling mechanism in the case of the friction force loads 24 failing to support the seal segment 12. In another example, the pins 16 carry a portion of the radial force loads 26 and the clamping friction force loads 24 carry the remaining second portion of the force loads 26 during use of the turbine shroud 10. In another example, the pins 16 carry the entire radial force loads 26 during use of the turbine shroud 10.

A first end of one of the pins 16 extends into the blind hole 48 formed in the fore carrier 40, through the through hole 36 formed in the mount post 30, and into the blind hole 58 formed in the aft carrier 42 as shown in FIG. 4. The slotted holes 48, 58 allows one of the pins 16 the ability to move with the seal segment 12 relative to the attachment unit 14. In illustrative embodiments, two pins extend into seal segment 12. The two pins 16 are spaced apart from one another circumferentially and are located substantially at the same radial distance relative to the axis 11.

The pins 16 each have a length such that the first end is located in the blind hole 48 and the second end is located in the blind hole 58. As such, the pins 16 may have some ability to move axially, but cannot come out of interlocking arrangement with the carriers 40, 42.

In illustrative embodiment, the turbine shroud 10 further includes a bias member 62 arranged around each pin 16 as shown in FIG. 4. The bias member 62 is located axially between the mount post 30 and one of the fore carrier 40 and the aft carrier 42. Illustratively, the bias member 62 is located axially between the fore face 32 of the mount post 30 and the fore body 46 of the fore carrier 40. The bias member 62 or a second bias member could be located between the aft face 34 and the aft carrier 42. The compression forces of the fore and aft carriers 40, 42 apply a force to the bias member 62. The bias member 62 applies an opposite force to the carriers 40, 42 and the mount post 30. Illustratively, the bias member 62 comprises a belleville washer. In other embodiments, the bias member 62 comprises a spring such as a compression spring or leaf spring.

The turbine shroud 10 further includes the plurality of keys 50 in the illustrative embodiment as shown in FIGS. 3 and 4. Each key 50 extends into the slots formed in the fore hanger 44 of the fore carrier 40 and the locator arm 56 of the aft carrier 42. The keys 50 couple the fore carrier 40 with the aft carrier 42 in such a way to maintain the compressive clamping forces 24 applied to the mount post 30. In other embodiments the keys 50 extend axially through the fore carrier 40 and the aft carrier 42 to couple the carriers 40, 42 together. In other embodiments, bonding or other fasteners such as, for example, pins, hooks, or bolts are used to couple the fore carrier 40 with the aft carrier 42.

Illustratively, turbine shroud 10 further includes a plurality of strip seals 60 that extend circumferentially into adjacent attachment units 14 and seal segments 12 to block gases from flowing between the adjacent attachment units 14 and seal segments 12. In other embodiments, the attachment unit 14 and/or seal segment 12 may be full hoop. In other embodiments other sealing features may be used between adjacent turbine shroud segments.

Another embodiment of a turbine shroud 210 in accordance with the present disclosure is shown in FIGS. 6-11. The turbine shroud 210 is substantially similar to the turbine shroud 10 shown in FIGS. 1-5 and described herein. Accordingly, similar reference numbers in the 200 series indicate features that are common between the turbine shroud 10 and the turbine shroud 210. The description of the turbine shroud 10 is incorporated by reference to apply to the turbine shroud 210, except in instances when it conflicts with the specific description and the drawings of the turbine shroud 210.

Figure 6:
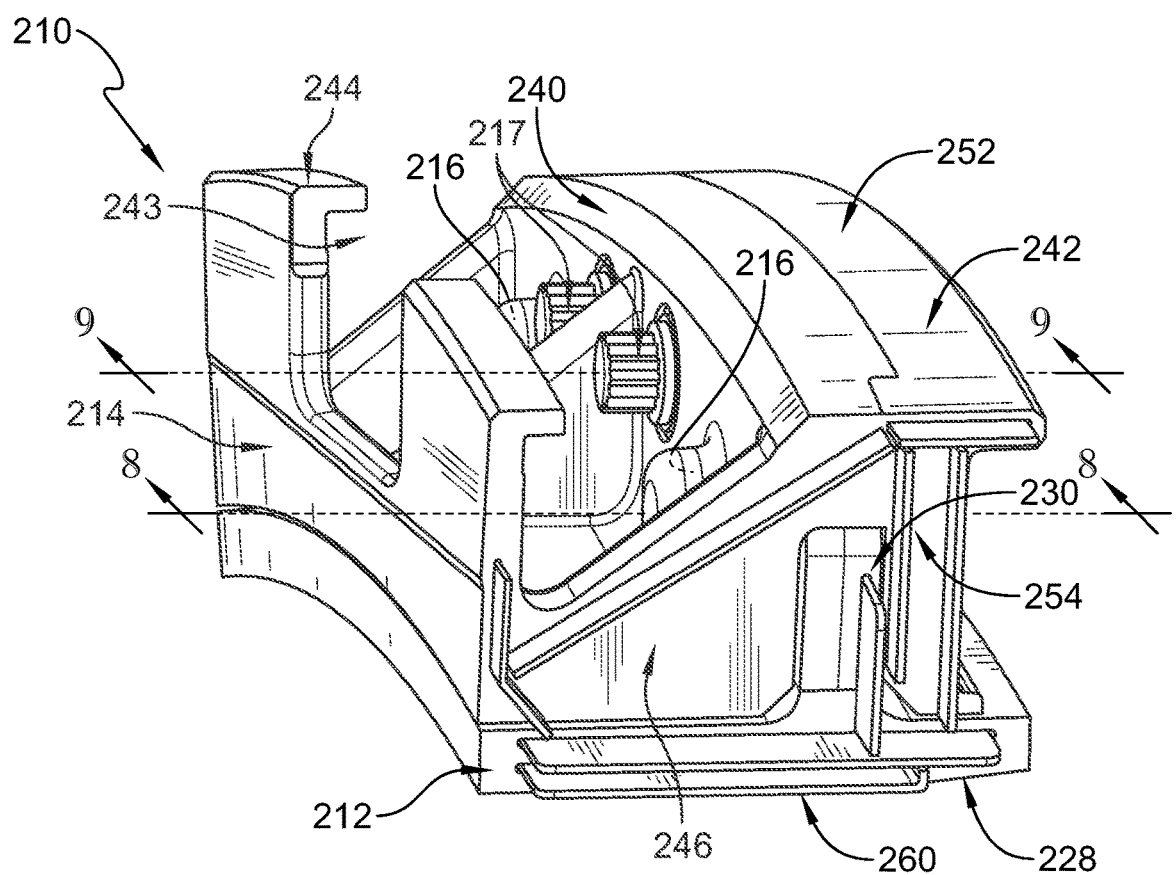
FIG. 6 is a perspective view of another turbine shroud adapted for use with the gas turbine engine of FIG. 1 showing the turbine shroud includes a seal segment clamped between a fore carrier and an aft carrier of an attachment unit.
Figure 7:
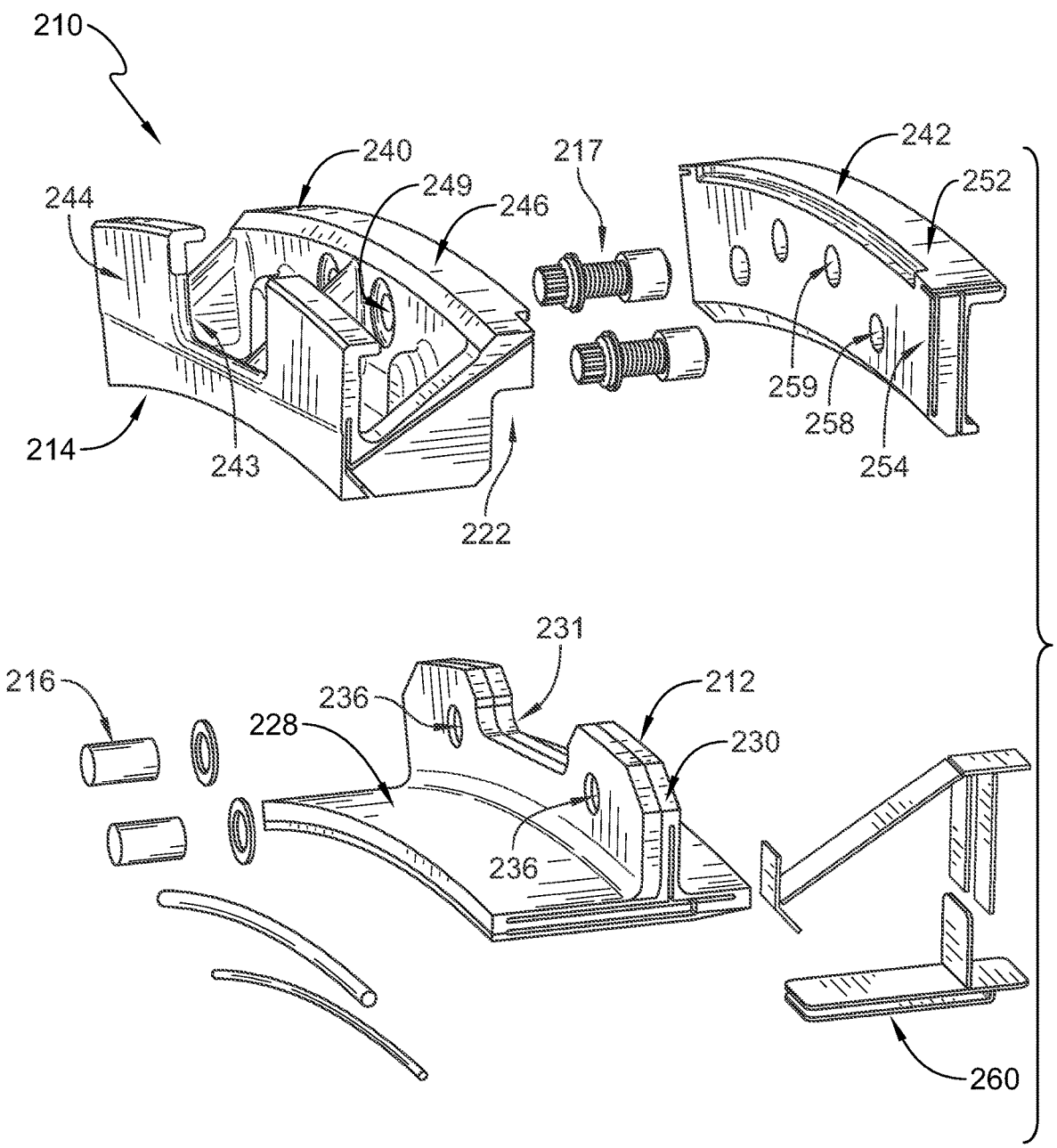
FIG. 7 is an exploded view of the turbine shroud of FIG. 6 showing the turbine shroud includes the seal segment, a plurality of pins, a plurality of fasteners, and the attachment unit that includes the fore carrier and the aft carrier.

The turbine shroud 210 includes a seal segment 212, an attachment unit 214, pins 216, and fasteners 217 as shown in FIGS. 6 and 7. The seal segment 212 extends partway circumferentially about an axis and defines a gas path boundary of the turbine shroud 210. The attachment unit 214 supports the seal segment 212 in position radially relative to the axis and defines a channel 222 that receives a portion of the seal segment 212 therein. The pins 216 extend into the seal segment 212 and the attachment unit 214 to mechanically interlock the seal segment 212 with the attachment unit 214. The fasteners 217 extend through the attachment unit 214 to apply a compressive force to the attachment unit 214. As compared to the turbine shroud 10, the turbine shroud 210 uses the fasteners 217 to provide the compressive friction forces in place of the keys 50 that hold the fore and aft carriers 40, 42 together.

The seal segment 212 includes an arcuate shroud wall 228 and a mount post 230 as shown in FIG. 7. The shroud wall 228 extends circumferentially partway about an axis to define a portion of the gas path. The mount post 230 extends radially away from the shroud wall 228.

Figure 8:
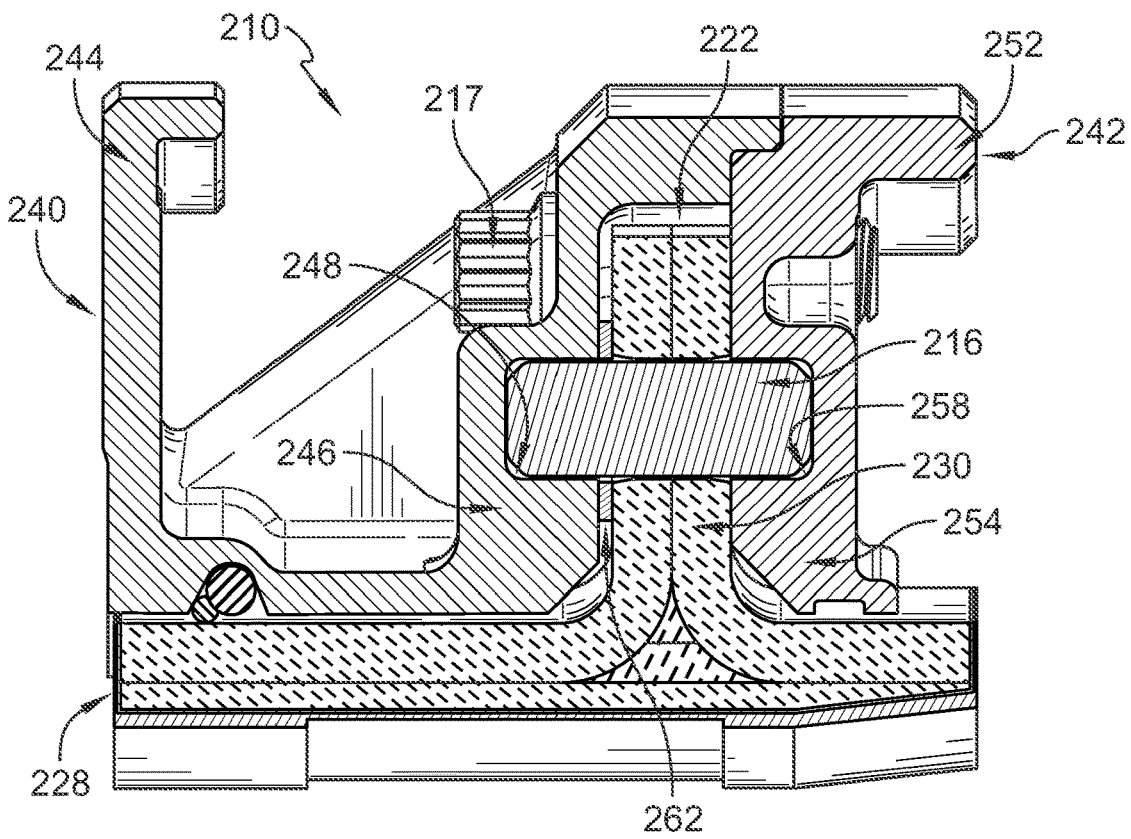
FIG. 8 is a section view of the turbine shroud taken along line 8-8 of FIG. 6 showing one of the pins extending into the fore carrier, through the seal segment, and into the aft carrier.
Figure 9:
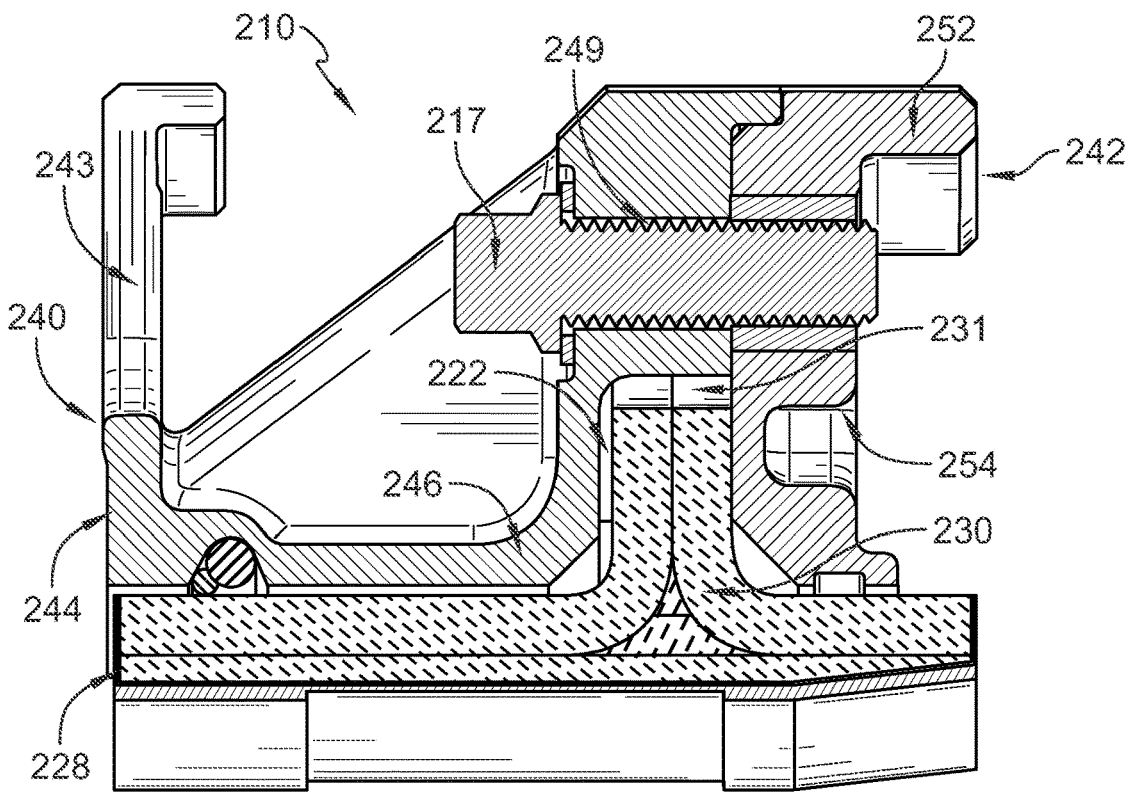
FIG. 9 is a section view of the turbine shroud taken along line 9-9 of FIG. 6 showing one of the fasteners extending through the fore carrier and the aft carrier to couple the carriers together without contacting the seal segment and to apply a compressive clamp force to the fore carrier and the aft carrier to clamp the seal segment between the carriers.

The mount post 230 extends substantially radially outward away from the shroud wall 228 as shown in FIGS. 7-9. The mount post 230 is received in the channel 222 and is clamped by the attachment unit 214. Illustratively, the seal segment 212 includes a single mount post 230. The mount post 230 is formed to include through holes 236 that extend axially through the mount post 230. The through holes 236 are circular shaped in the illustrative embodiment.

The mount post 230 is further formed to define a cutout 231 that extends radially inward into the mount post 230 as shown in FIG. 7. The cutout 231 is sized to allow the fasteners 217 to extend through the cutout 231 without contacting the seal segment 212 as shown in FIG. 9. The cutout 231 defines tabs or ears at the circumferential ends of the mount post 230 and the through holes 236 are formed in the tabs/ears.

The attachment unit 214 supports the seal segment 212 in position radially relative to the axis as suggested in FIGS. 6-9. The attachment unit 214 includes a fore carrier 240 that extends circumferentially at least partway about the axis and an aft carrier 242 that extends circumferentially at least partway about the axis. The fore carrier 240 and the aft carrier 242 cooperate to define the channel 222 that opens radially inwardly and receives a portion of the mount post 230 of the seal segment 212 to locate the mount post 230 axially between the fore carrier 240 and the aft carrier 242.

Figure 10:
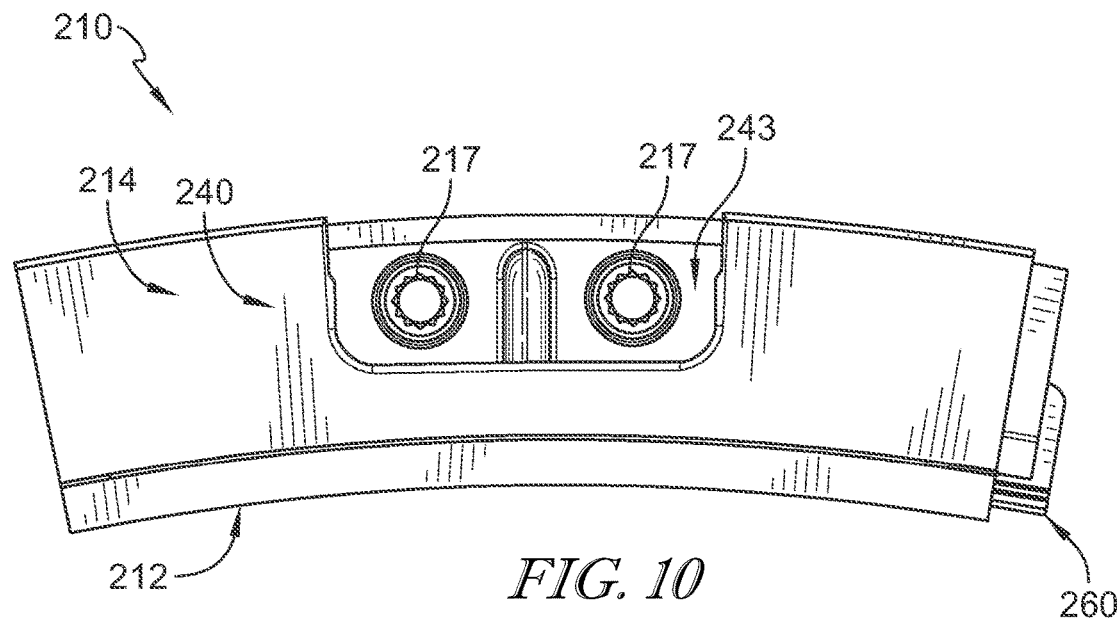
FIG. 10 is a front elevation view of the turbine shroud of FIG. 6.
Figure 11:
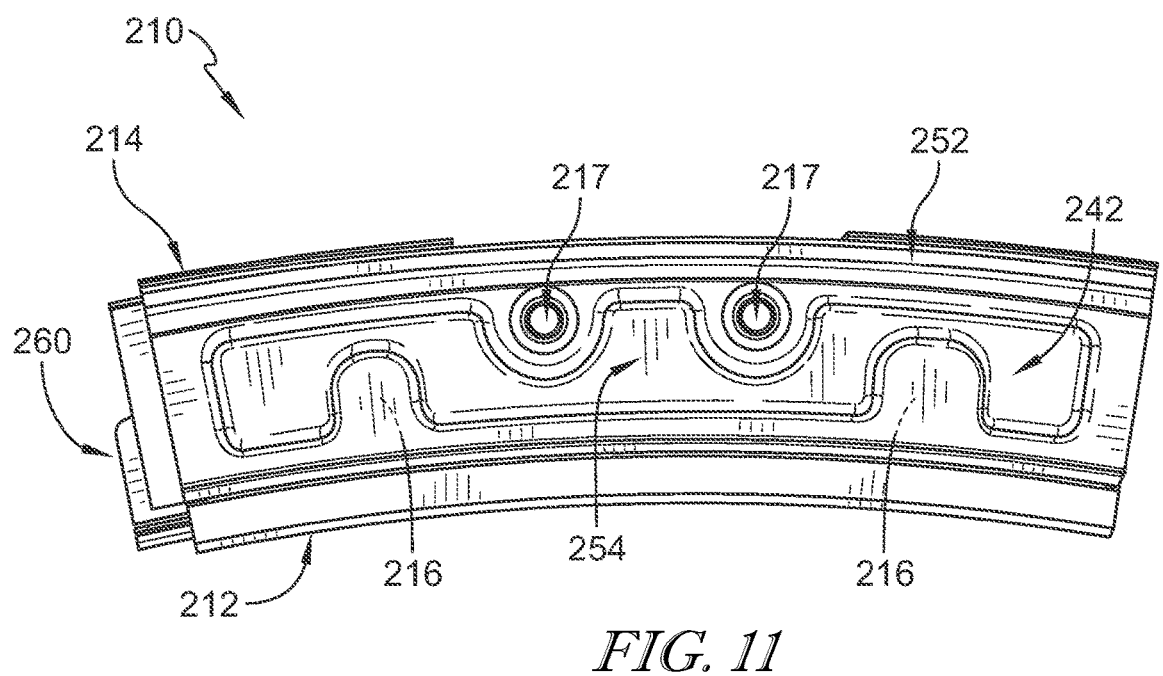
FIG. 11 is a rear elevation view of the turbine shroud of FIG. 6.

The fore carrier 240 includes a fore hanger 244 and a fore body 246 as shown in FIGS. 6-9. The fore hanger 244 is configured to be supported on a case of the engine. The fore body 246 is coupled with the fore hanger 244 and extends axially along the shroud wall 228 and radially along the mount post 230 of the seal segment 212. The fore body 246 is spaced apart axially from the mount post 230 due to a bias member 262. In other embodiments, the fore body 246 directly engages the mount post 230. Illustratively, the fore hanger 244 is formed to define a cutout 243 that extends axially through and radially into the fore hanger 244 to provide access to the fasteners 217 as shown in FIGS. 6 and 10.

The fore body 246 is formed to define a plurality of blind holes 248 that extend axially partway into the fore body 246. The blind holes 248 are spaced apart from each other circumferentially. One blind hole 248 is circular in shape and one blind hole is a circumferentially extending slot 248 when viewed axially relative to the axis. The slot allows for relative thermal growth between the fore carrier 240 and the seal segment 212. The fore body 246 further includes a plurality of through holes 249 for receiving the fasteners 217. The through holes 249 are spaced apart circumferentially from one another and located between the blind holes 248.

The aft carrier 242 includes an aft hanger 252 and an aft body 254 as shown in FIGS. 6-9. The aft hanger 252 is configured to be supported on the case of the engine. The aft body 254 is coupled with the aft hanger 252 and extends radially inward from the aft hanger 252. The aft body 254 extends axially along the shroud wall 228 and radially along the mount post 230. The fore body 246 and the aft body 254 cooperate to define the channel 222. The aft body 254 engages directly the mount post 230.

The aft body 254 is formed to define a plurality of blind holes 258 that extend axially partway into the aft body 254. The blind holes 258 are spaced apart from each other circumferentially. One blind hole 258 is circular in shape and one blind hole 258 is a circumferentially extending slot 258 when viewed axially relative to the axis. The slot allows for relative thermal growth between the aft carrier 242 and the seal segment 212. The aft body 254 is formed to define a plurality of through holes 259 as shown in FIG. 7. The through holes 259 are spaced apart from each other circumferentially and sized to receive the fasteners 217. The through holes 259 are located circumferentially between the blind holes 258. The through holes 259 are located radially outward of the blind holes 258.

Each of the plurality of pins 216 extends axially into the fore carrier 240, the mount post 230, and the aft carrier 242 to mechanically interlock the seal segment 212 with the attachment unit 214 and limit circumferential movement of the seal segment 212 relative to the attachment unit 214. The pins 216 block circumferential movement of the seal segment 212 relative the attachment unit 214. The pins 216 may receive a portion of, all of, or none of the radial force loads applied to the seal segment 212.

A first end of one of the pins 216 extends into the blind hole 248 formed in the fore carrier 240, through the through hole 236 formed in the mount post 230, and into the blind hole 258 formed in the aft carrier 242 as shown in FIG. 8. The slotted holes 248, 258 allows one of the pins 216 the ability to move with the seal segment 212 relative to the attachment unit 214. In illustrative embodiment, the turbine shroud 10 further includes the bias member 62 arranged around each pin 16 as shown in FIG. 8.

Each fastener 217 extends axially through one of the holes 249 and one of the holes 259 as shown in FIG. 9. The fasteners 217 do not contact the seal segment 212. Illustratively, the fasteners 217 include bolts and nuts. In other embodiments, the fasteners 217 may include keys, pins, rivets, hooks, etc.

Illustratively, turbine shroud 210 further includes a plurality of strip seals 260 that extend circumferentially into adjacent attachment units 214 and seal segments 212 to block gases from flowing between the adjacent attachment units 214 and seal segments 212. In other embodiments, the attachment unit 214 and/or seal segment 212 may be full hoop. In other embodiments other sealing features may be used between adjacent turbine shroud segments.

Figure 12:
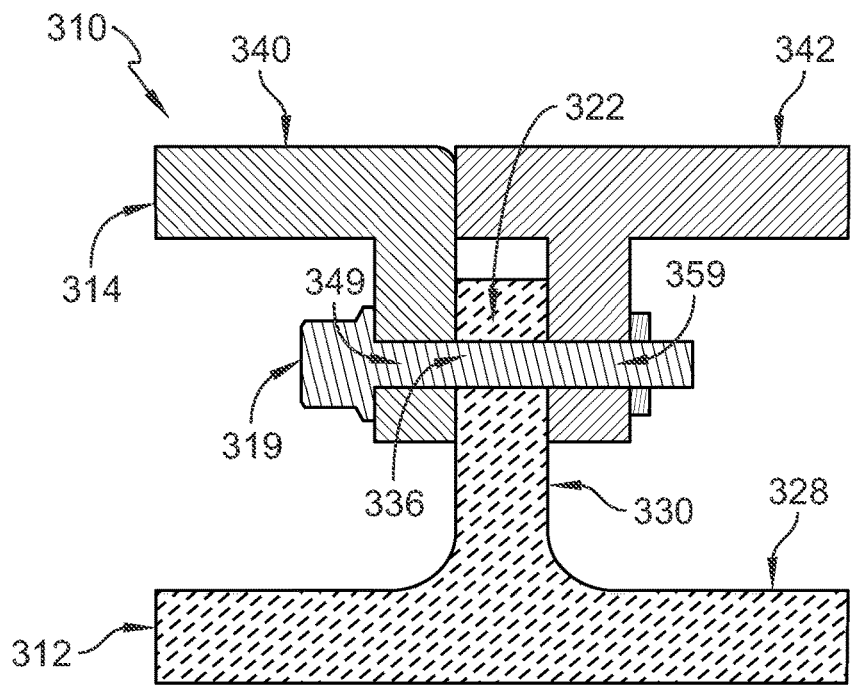
FIG. 12 is a sectional view of a turbine shroud having an attachment unit and a seal segment located between fore and aft carriers of the attachment unit, and a pin embodied as a fastener that extends through each of the fore carrier, the seal segment, and the aft carrier to couple the components together to clamp the seal segment between the fore and aft carriers.

Another embodiment of a turbine shroud 310 in accordance with the present disclosure is shown in FIG. 12. The turbine shroud 310 is substantially similar to the turbine shroud 10 shown in FIGS. 1-5 and described herein. Accordingly, similar reference numbers in the 300 series indicate features that are common between the turbine shroud 10 and the turbine shroud 310. The description of the turbine shroud 10 is incorporated by reference to apply to the turbine shroud 310, except in instances when it conflicts with the specific description and the drawings of the turbine shroud 310.

The turbine shroud 310 includes a seal segment 312, an attachment unit 314, and fasteners 317 as shown in FIG. 12. The seal segment 312 extends partway circumferentially about an axis and defines a gas path boundary of the turbine shroud 310. The attachment unit 314 supports the seal segment 312 in position radially relative to the axis and defines a channel 322 that receives a portion of the seal segment 312 therein. The fasteners 317 extend through the attachment unit 314 and the seal segment 312 to apply a compressive force to the attachment unit 314 and seal segment 312 to couple those components together. The turbine shroud 310 may or may not include pins that extend into the attachment unit 314 and seal segment 312.

The seal segment 312 includes an arcuate shroud wall 328 and a mount post 330 as shown in FIG. 12. The shroud wall 328 extends circumferentially partway about the axis to define a portion of the gas path. The mount post 330 extends radially away from the shroud wall 328. The mount post 330 extends substantially radially outward away from the shroud wall 328. The mount post 330 is received in the channel 322 and is clamped by the attachment unit 314. Illustratively, the seal segment 312 includes a single mount post 330. The mount post 330 is formed to include through holes 336 that extend axially through the mount post 330. The through holes 336 are circular shaped in the illustrative embodiment.

The attachment unit 314 supports the seal segment 312 in position radially relative to the axis as suggested in FIG. 12. The attachment unit 314 includes a fore carrier 340 that extends circumferentially at least partway about the axis and an aft carrier 342 that extends circumferentially at least partway about the axis. The fore carrier 340 and the aft carrier 342 cooperate to define the channel 322 that opens radially inwardly and receives a portion of the mount post 330 of the seal segment 312 to locate the mount post 330 axially between the fore carrier 340 and the aft carrier 342.

The fore carrier 340 is formed to define through holes 349 and the aft carrier 342 is formed to define through holes 359 as suggested in FIG. 12. In some embodiments, one of the holes 349 and a corresponding one of the holes 359 are slot shaped while the other holes 349, 359 are circular shaped. The fasteners 317 extend through the holes 349, 336, 359 to couple the seal segment 312 with the attachment unit 314.

The fasteners 317 apply the compressive force loads to the components such that a friction force is applied to the seal segment 312 and counteracts at least a portion of the radial force loads acting on the seal segment 312. The fasteners 317 may counteract some or all of the radial force loads acting on the seal segment 312 such that they may provide the secondary, redundant, or primary support of the seal segment 312. Illustratively, no bias member is used with the turbine shroud 310 and the fore and aft carriers 340, 342 contact the mount post 330 directly.

Figure 13:
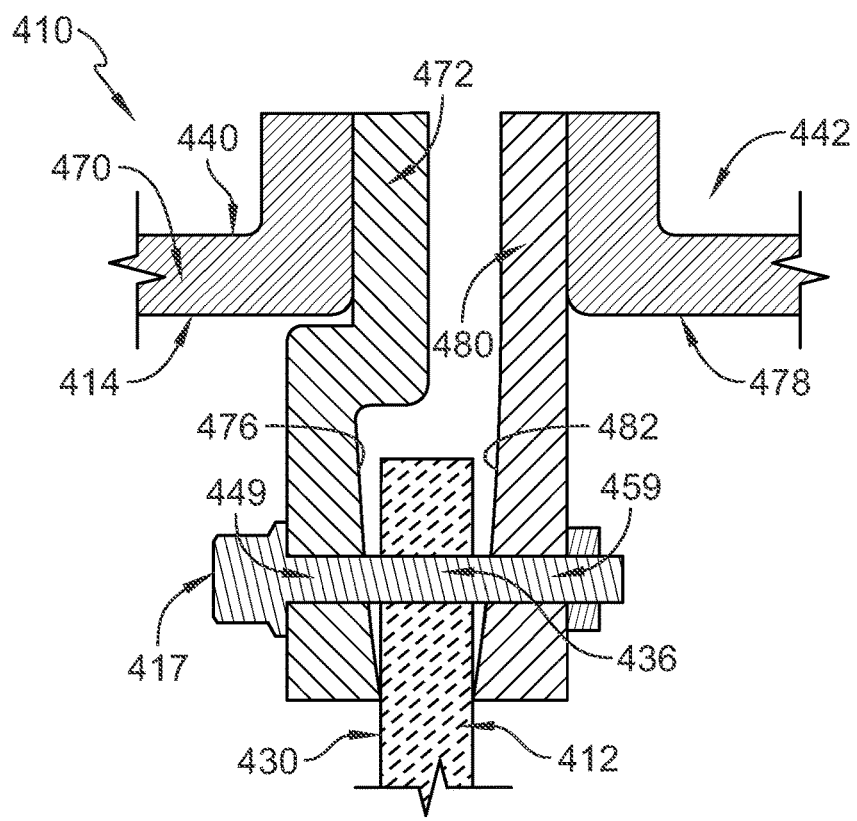
FIG. 13 is a sectional view of a turbine shroud having a fore and aft friction plate coupled with casings of the gas turbine engine and a portion of a seal segment located between the friction plates to couple the seal segment with the friction plates via clamping and showing a pin extending through the seal segment and friction plate to interlock the components.

Another embodiment of a turbine shroud 410 in accordance with the present disclosure is shown in FIG. 13. The turbine shroud 410 is substantially similar to the turbine shroud 310 shown in FIG. 12 and described herein. Accordingly, similar reference numbers in the 400 series indicate features that are common between the turbine shroud 310 and the turbine shroud 410. The description of the turbine shroud 310 is incorporated by reference to apply to the turbine shroud 410, except in instances when it conflicts with the specific description and the drawings of the turbine shroud 410.

The turbine shroud 410 includes a seal segment 412, an attachment unit 414, and fasteners 417 as shown in FIG. 13. The seal segment 412 extends partway circumferentially about an axis and defines a gas path boundary of the turbine shroud 410. The attachment unit 414 supports the seal segment 412 in position radially relative to the axis and defines a channel 422 that receives a portion of the seal segment 412 therein. The fasteners 417 extend through the attachment unit 414 and seal segment 412 to apply a compressive force to the attachment unit 414 and seal segment 412 to couple those components together. The turbine shroud 410 may or may not include pins that extend into the attachment unit 414 and seal segment 412.

The seal segment 412 includes an arcuate shroud wall 428 and a mount post 430 as shown in FIG. 13. Illustratively, the seal segment 412 includes a single mount post 430. The mount post 430 is formed to include through holes 436 that extend axially through the mount post 430. The through holes 436 are circular shaped in the illustrative embodiment. The mount post 430 has a fore face 432 and an aft face 434 opposite the fore face 434.

The attachment unit 414 supports the seal segment 412 in position radially relative to the axis as suggested in FIG. 13. The attachment unit 414 includes a fore carrier 440 that extends circumferentially at least partway about the axis and an aft carrier 442 that extends circumferentially at least partway about the axis. The fore carrier 440 and the aft carrier 442 cooperate to define the channel 422 that opens radially inwardly and receives a portion of the mount post 430 of the seal segment 412 to locate the mount post 430 axially between the fore carrier 440 and the aft carrier 442.

The fore carrier 440 includes a fore support body 470 and a fore plate 472 coupled with the fore support body 470 as shown in FIG. 13. In some embodiments, the fore support body 470 and the fore plate 472 are integral and form a single component. The fore plate 472 is formed to define through holes 449. The fore plate 472 includes an inner surface 476 that faces the mount post 430. The inner surface 476 is angled by an acute angle relative to the mount post 430. Illustratively, the inner surface 476 is angled by an acute angle relative to a plane that extends perpendicular and radially to a central axis of the shroud 410.

The aft carrier 442 includes an aft support body 478 and an aft plate 480 coupled with the aft support body 478 as shown in FIG. 13. In some embodiments, the aft support body 478 and the aft plate 480 are integral and form a single component. The aft plate 480 is formed to define through holes 449. The aft plate 480 includes an inner surface 482 that faces the mount post 430. The inner surface 482 is angled by an acute angle relative to the mount post 430. Illustratively, the inner surface 482 is angled by an acute angle relative to a plane that extends perpendicular and radially to a central axis of the shroud 410. In other embodiments, one of the surfaces 476, 480 is parallel with the plane and the mount post 430.

The fasteners 417 apply the compressive force loads to the components such that a friction force is applied to the seal segment 412 and counteracts at least a portion of the radial force loads acting on the seal segment 412. The fasteners 417 may counteract some or all of the radial force loads acting on the seal segment 412 such that they may provide the secondary, redundant, or primary support of the seal segment 412. Illustratively, no bias member is used with the turbine shroud 410 and the fore and aft carriers 440, 442 contact the mount post 430 directly.

In some embodiments, one of the holes 449 and a corresponding one of the holes 459 are slot shaped while the other holes 449, 459 are circular shaped. The fasteners 417 extend through the holes 448, 436, 458 to couple the seal segment 412 with the attachment unit 414.

Figure 14:
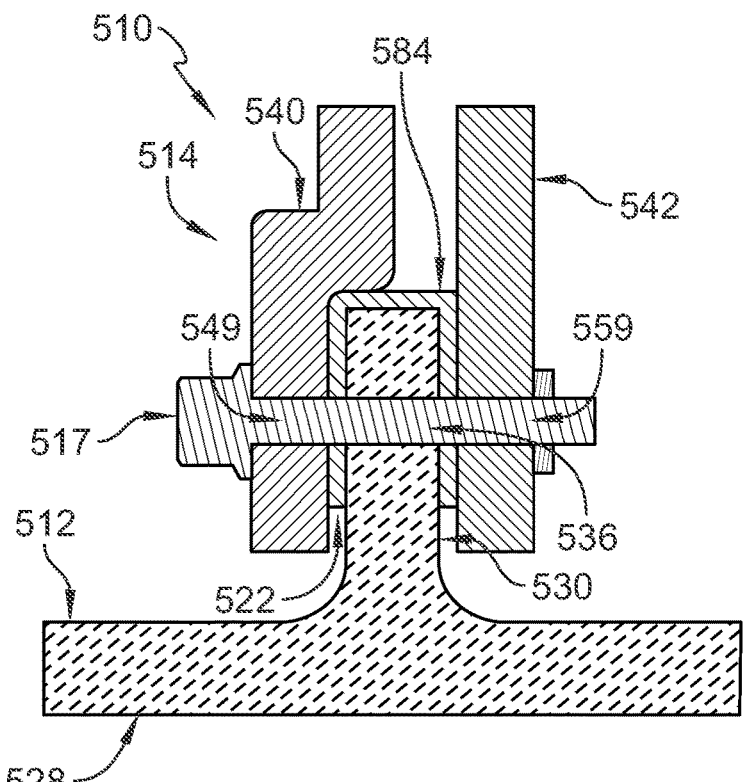
FIG. 14 is a sectional view of a turbine shroud showing a layer of material acting as a shim between the attachment unit and the seal segment.

Another embodiment of a turbine shroud 510 in accordance with the present disclosure is shown in FIG. 14. The turbine shroud 510 is substantially similar to the turbine shroud 310 shown in FIG. 12 and described herein. Accordingly, similar reference numbers in the 500 series indicate features that are common between the turbine shroud 310 and the turbine shroud 510. The description of the turbine shroud 310 is incorporated by reference to apply to the turbine shroud 510, except in instances when it conflicts with the specific description and the drawings of the turbine shroud 510.

The turbine shroud 510 includes a seal segment 512, an attachment unit 514, fasteners 517, and a shim 584 as shown in FIG. 14. The seal segment 512 extends partway circumferentially about an axis and defines a gas path boundary of the turbine shroud 510. The attachment unit 514 supports the seal segment 512 in position radially relative to the axis and defines a channel 522 that receives a portion of the seal segment 512 therein. The fasteners 517 extend through the attachment unit 514 and the seal segment 512 to apply a compressive force to the attachment unit 514 and seal segment 512 to couple those components together. The turbine shroud 510 may or may not include pins that extend into the attachment unit 514 and seal segment 512.

The seal segment 512 includes an arcuate shroud wall 528 and a mount post 530 as shown in FIG. 14. The mount post 530 is formed to include through holes 536 that extend axially through the mount post 530.

The attachment unit 514 supports the seal segment 512 in position radially relative to the axis as suggested in FIG. 14. The attachment unit 514 includes a fore carrier 540 that extends circumferentially at least partway about the axis and an aft carrier 542 that extends circumferentially at least partway about the axis. The fore carrier 540 and the aft carrier 542 cooperate to define the channel 522. The fore carrier 540 is formed to define through holes 549 and the aft carrier 542 is formed to define through holes 559. The fasteners 517 extend through the holes 549, 536, 559 to couple the seal segment 512 with the attachment unit 514.

The shim 584 is arranged around a tip of the mount post 530 and provides a layer of material between the fore carrier 540, the aft carrier 542, and the mount post 530. As one example, the shim 584 may provide an interface layer between the carriers 540, 542 made of nickel and free silicon in the ceramic matrix composite materials of the mount post 530. Use of the shim 584 may allow the mount post 530 to have unmachined faces.

Figure 15:
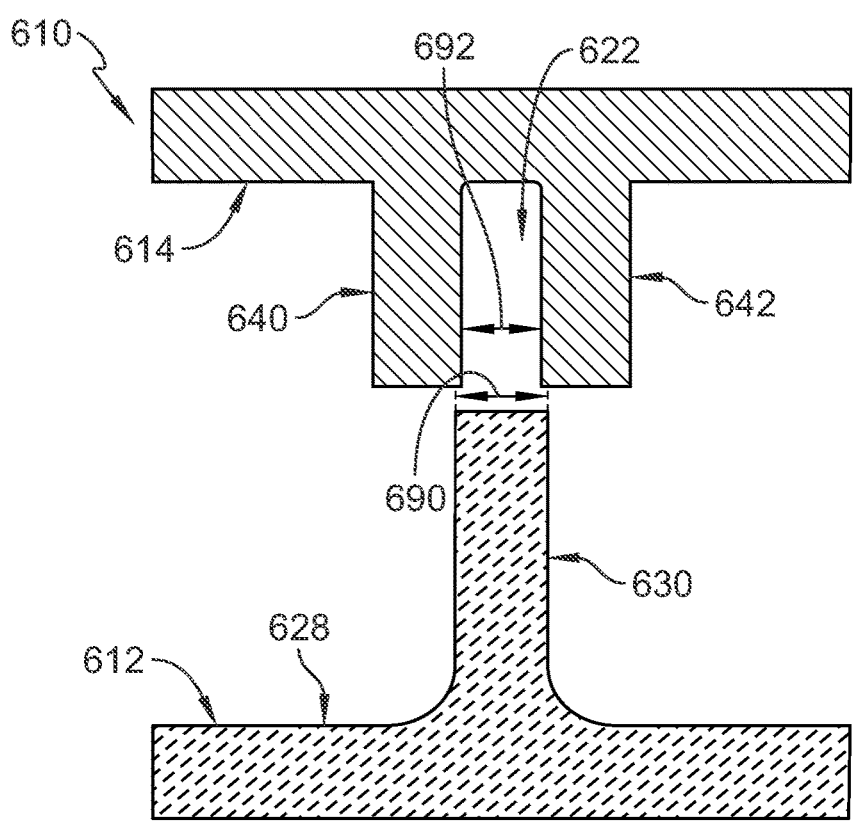
FIG. 15 is a sectional view of a turbine shroud having a single, unitary attachment unit and a seal segment and the seal segment is configured to be received in a channel of the attachment unit by an interference fit to couple the seal segment with the attachment only by frictional forces.

Another embodiment of a turbine shroud 610 in accordance with the present disclosure is shown in FIG. 15. The turbine shroud 610 is substantially similar to the turbine shroud 310 shown in FIG. 12 and described herein. Accordingly, similar reference numbers in the 600 series indicate features that are common between the turbine shroud 310 and the turbine shroud 610. The description of the turbine shroud 310 is incorporated by reference to apply to the turbine shroud 610, except in instances when it conflicts with the specific description and the drawings of the turbine shroud 610.

The turbine shroud 610 includes a seal segment 612 and an attachment unit 614 as shown in FIG. 15. The illustrative turbine shroud 610 does not fasteners or pins to support the seal segment 612. The seal segment 612 extends partway circumferentially about an axis and defines a gas path boundary of the turbine shroud 610. The attachment unit 614 supports the seal segment 612 in position radially relative to the axis and defines a channel 622 that receives a portion of the seal segment 612 therein. The turbine shroud 610 may or may not include pins that extend into the attachment unit 614 and seal segment 612.

The seal segment 612 includes an arcuate shroud wall 628 and a mount post 630 as shown in FIG. 15. The mount post 630 is not formed to include any through holes in this illustrative embodiment. The mount post 630 has an axial length 690.

The attachment unit 614 supports the seal segment 612 in position radially relative to the axis as suggested in FIG. 15. The attachment unit 614 includes a fore carrier 640 that extends circumferentially at least partway about the axis and an aft carrier 642 that extends circumferentially at least partway about the axis. The fore carrier 640 and the aft carrier 642 are integrally formed to provide a single, one-piece component. The fore carrier 640 and the aft carrier 642 cooperate to define the channel 622. The channel 622 has an axial length 692. The axial length 692 of the channel 622 is less than the axial length 690 of the mount post 630 when the two parts are room temperature and separated from one another.

The seal segment 612 is coupled with the attachment unit 614 for movement with the attachment unit 614 only by frictional forces between the seal segment 612, the fore carrier 640, and the aft carrier 642. The mount post 630 is interference fit in the channel 622. During assembly, at least one of the seal segment 612 and the attachment unit 614 is heated or cooled to vary a size of at least one of the axial lengths 690, 692. The mount post 630 is then inserted into the channel 622 and the seal segment 612 and the attachment unit 614 are allowed to normalize in temperature. As a result, the mount post 630 is interference fit with the attachment unit 614. The frictional forces from the interference fit alone are sufficient to block radial movement of the seal segment 612 relative to the attachment unit 614.

In one example, the attachment unit 614 is heated to increase the axial length 692 of the channel 622. The seal segment 612 is then inserted into the channel 622 and the attachment unit 614 is allowed to cool. The seal segment 612 may or may not be cooled.

The present disclosure provides methods and apparatuses for supporting ceramic matrix composite seal segments 12, 212, 312, 412, 512, 612 using friction clamping. A large enough clamping force may be applied across the seal segment 12, 212, 312, 412, 512, 612 can result in a significant frictional force being applied between the metallic clamps (carriers) 40, 240, 340, 440, 540, 640, 42, 242, 342, 442, 542, 642 and the ceramic matrix composite seal segment 12, 212, 312, 412, 512, 612. The frictional force may be sufficient to hold the seal segment 12, 212, 312, 412, 512, 612 in place relative to the axis 11 at all operating points of the gas turbine engine 110 throughout the operating envelope without the assistance of other fasteners or interlocking mechanisms like pins, bolts, keys, hooks, etc.

In one embodiment, each seal segment 312 has the shape of an upside-down "T" as shown in FIG. 12. The seal segment 312 is fitted between a forward friction plate 340 and an aft friction plate 342 (these two pieces forming the fore and aft carriers 340, 342 in the illustrative embodiment). A bolt 317 may secure these two plates 340, 342 around the seal segment 312. The bolt 317 is tightened such that a minimum clamp load required to hold the seal segment 312 in friction would be maintained throughout the operating envelope of the gas turbine engine 110. Positioning of the seal segment relative to the carrier elements 340, 342 can be achieved by piloting the seal segment 312 outer diameter against the inner diameter of the one of the friction plates 340, 342 or by using tight tolerance holes with tight tolerance bolts.

A modification on the above described embodiment allows for the radial load applied to the seal segment 312 to be shared between the clamp force applied by the carriers 340, 342 and the retaining bolt. It is feasible that the radial load could be held solely by a plurality of bolts/pins, but one advantage of the load sharing of the present disclosure is that the friction grip reduces the overall load on each bolt 317. This may reduce the peak mechanical loads on the mount post 330 of the seal segment 312.

In another embodiment, full hoop forward and aft friction plates 472, 480 are bolted between the combustor 116 (or stub) and turbine 118 cases as shown in FIG. 13. The hoop may be split from the inner radius of the friction plate up close to the flange to ensure that the friction plates 472, 480 do not adversely affect the tip clearance control system. The split in the case may be designed to minimize stress concentration factor. In this embodiment, there exist two gaps until the flanges are fully tightened.

A first gap (between the fore plate 472 and the mount post 430) is slightly larger than a second gap (between the fore plate 472 and the aft plate 480 at the radial outer area) as suggested in FIG. 13. As such, when the parts grow thermally, the spring force applied to the segment 412 does not reduce to the point where the segment 412 can be released due to a loss of the frictional force. The face of one or both of the friction plates 472, 480 be slightly angled such that, when the plates are clamped at the outer flange, the faces are in full contact with the ceramic matrix composite seal segment 412 to allow maximum amount of contact and, therefore, the maximum amount of friction. The turbine shroud 410 could be designed to have the friction clamp load support the radial load fully or share the load with bolts/pins.

A layer of thin material (shim) 584 located between the ceramic matrix composite seal segment 512 and carrier components 540, 542 may be used with the different embodiments of the turbine shrouds as suggested in FIG. 14. In some embodiments, the shim 584 is made of a cobalt alloy. Using the thin shim 584 may allow the ceramic matrix composite mount post 530 vertical faces to remain unmachined during the manufacturing process of the seal segment 512 depending on the tolerances. If unmachined, the clamp load would compress the shim 584 into a form that more closely matches the ceramic matrix composite mount post surface. The grooves and valleys formed in the unmachined mount post surface may provide additional mechanical interlocking between the mount post and the shim 584. The shim 584 may provide an interface layer between the nickel carrier 540, 542 and free silicon in the ceramic matrix composite materials of the seal segment 512.

In other embodiments, the thermal growth of the components provide the compression load to couple the seal segment 612 with the attachment unit 614 as shown in FIG. 15. The carrier channel 622 clearance width would be smaller than ceramic matrix composite mount post thickness so that the mount post 630 is received in the gap via an interference fit. This embodiment may reduce the number of parts in the assembly because a single, unitary attachment unit 614 may be used and pins and bolts could be omitted.

The carrier 640, 642 could be heated during assembly such that the mount post 630 could be inserted into the channel 622. Then, after cool down, an interference fit would exist between the parts which would apply a compressive load and provide the frictional forces to couple the seal segment 612 with the attachment unit 614. The carrier 640, 642 may be formed of mar-m247 and the seal segment 612 may be made of SiC/SiC CMC. This configuration may include pins/bolts for backup through the channel arrangement as a fail-safe for the friction coupling.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud adapted for use in a gas turbine engine, the turbine shroud comprising
    a seal segment comprising ceramic matrix composite materials, the seal segment including an arcuate shroud wall that extends circumferentially partway around an axis to define a gas path boundary of the turbine shroud and a mount post that extends radially outward away from the shroud wall,
    an attachment unit comprising metallic materials and configured to support the seal segment in position radially relative to the axis, the attachment unit including a fore carrier that extends at least partway about the axis and an aft carrier that extends at least partway about the axis and cooperates with the fore carrier to define a channel that opens radially inwardly and receives a portion of the mount post of the seal segment to locate the mount post of the seal segment axially between the fore carrier and the aft carrier, and
    a pin that extends axially into the fore carrier, the mount post, and the aft carrier to interlock the seal segment with the attachment unit, whereby radial force loads from gases are applied to inner and outer radial sides of the shroud wall during use of the turbine shroud which urge the seal segment to move radially relative to the attachment unit and wherein the seal segment is clamped between the fore carrier and the aft carrier so that frictional forces acting on the mount post counteract at least a portion of the radial force loads to resist radial movement of the mount post relative to the attachment unit.

2. The turbine shroud of claim 1, wherein the fore carrier is formed to include an axially extending first blind hole, the mount post is formed to include an axially extending through hole, the aft carrier is formed to include an axially extending second blind hole, and the pin extends into the first blind hole, through the through hole, and into the second blind hole.

3. The turbine shroud of claim 2, wherein the attachment unit further includes a key that extends radially into the fore carrier and the aft carrier to couple the fore carrier with the aft carrier and maintain the compressive clamp force applied to the mount post.

4. The turbine shroud of claim 2, wherein the fore carrier is formed to include a first through hole, the aft carrier is formed to define a second through hole, and the attachment unit further includes a fastener that extends through the first through hole and the second through hole to couple the first carrier with the second carrier.

5. The turbine shroud of claim 4, wherein the mount post is formed to define a cutout that extends radially inward partway into the mount post and axially through the mount post so that the mount post is U-shaped when viewed axially relative to the axis and the fastener extends through the cutout without contacting the mount post.

6. The turbine shroud of claim 1, wherein the seal segment is clamped between the fore carrier and the aft carrier so that the frictional forces acting on the mount post counteract all of the radial force loads to resist radial movement of the mount post relative to the attachment unit such that no radial force loads are counteracted by the pin.

7. The turbine shroud of claim 1, wherein the fore carrier includes a fore support body and a fore plate having a fore facing surface and an aft facing surface, the second carrier includes an aft support body and an aft plate having a fore facing surface and an aft facing surface, the fore plate and the aft plate are clamped between the fore support body and the aft support body, the mount post is clamped between the fore plate and the aft plate, and at least one of the aft facing surface of the fore plate and the fore facing surface of the aft plate are angled relative to a plane that extends perpendicular to the axis.

8. A turbine shroud adapted for use in a gas turbine engine, the turbine shroud comprising
a seal segment that includes an arcuate shroud wall that extends circumferentially partway around an axis and a mount post that extends radially outward away from the shroud wall, and
an attachment unit that extends at least partway about the axis, the attachment unit includes a first carrier and a second carrier that cooperate to define a channel that opens radially inwardly and receives at least a portion of the mount post, and the first carrier coupled with the second carrier such that the first carrier and the second carrier apply a compressive clamp force to the mount post of the seal segment.

9. The turbine shroud of claim 8, further comprising a pin that extends axially into the first carrier, the mount post, and the second carrier to interlock the seal segment with the attachment unit.

10. The turbine shroud of claim 9, wherein the first carrier is formed to include an axially extending first blind hole, the mount post is formed to include an axially extending through hole, the second carrier is formed to include an axially extending second blind hole, and the pin extends into the first blind hole, through the through hole, and into the second blind hole.

11. The turbine shroud of claim 10, wherein the first blind hole and the second blind hole are circumferentially extending slots.

12. The turbine shroud of claim 9, further comprising a bias member arranged around the pin and located between the mount post and one of the first carrier and the second carrier.

13. The turbine shroud of claim 8, wherein the first carrier is formed to include a first through hole, the second carrier is formed to define a second through hole, and the attachment unit further includes a fastener that extends through the first through hole and the second through hole to couple the first carrier with the second carrier.

14. The turbine shroud of claim 13, wherein the mount post is formed to define a cutout that extends radially inward partway into the mount post and axially through the mount post and the fastener extends through the cutout without contacting the mount post.

15. The turbine shroud of claim 13, further comprising a first pin and a second pin spaced apart circumferentially from the first pin that each extend axially into the first carrier, the mount post, and the second carrier to interlock the seal segment with the attachment unit.

16. The turbine shroud of claim 8, wherein the first carrier has a first engagement surface, the mount post has a first face engaged with the first engagement surface, and the first engagement surface is angled relative to first face to define an angle therebetween, and the angle is less than 90 degrees.

17. The turbine shroud of claim 8, wherein the shroud segment further includes a shim located between the mount post and the first carrier and directly engaged with the mount post and the first carrier.

18. The turbine shroud of claim 8, wherein the first carrier and the second carrier are integrally formed as a one-piece component and the seal segment is coupled with the attachment unit for movement with the attachment unit only by frictional forces between the seal segment, the first carrier, and the second carrier.

19. A method comprising
providing a seal segment, an attachment unit, and a pin, the seal segment includes an arcuate shroud wall and a mount post that extends outward away from the shroud wall, and the attachment unit including a first carrier and a second carrier that cooperate to define a channel between the first carrier and the second carrier,
locating the mount post in the channel,
inserting the pin through the mount post and at least partway into the first carrier and the second carrier, and
applying a clamp force to the mount post with the first carrier and the second carrier.

20. The method of claim 19, further including inserting a key or fastener into the first carrier and the second carrier to couple the first carrier with the second carrier and maintain the clamp force on the mount post.

* * * * *